(12) United States Patent
Schlight

(10) Patent No.: US 11,327,720 B2
(45) Date of Patent: *May 10, 2022

(54) AUTOMATED GENERATION OF SOFTWARE BINDINGS

(71) Applicant: Simply Inspired Software, Inc., Ashland, OR (US)

(72) Inventor: James P. Schlight, Ashland, OR (US)

(73) Assignee: SIMPLY INSPIRED SOFTWARE, INC., Ashland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/950,065

(22) Filed: Nov. 17, 2020

(65) Prior Publication Data

US 2021/0072961 A1 Mar. 11, 2021

Related U.S. Application Data

(63) Continuation of application No. 16/782,786, filed on Feb. 5, 2020, now Pat. No. 10,846,059.

(Continued)

(51) Int. Cl.
*H04L 29/08* (2006.01)
*H04L 29/06* (2006.01)
(Continued)

(52) U.S. Cl.
CPC .............. *G06F 8/30* (2013.01); *G06F 8/315* (2013.01); *G06F 8/73* (2013.01); *G06F 9/451* (2018.02);
(Continued)

(58) Field of Classification Search
CPC . G06F 8/427; G06F 8/65; G06F 40/58; G06F 40/30; G06F 40/51; G06F 9/541;
(Continued)

(56) References Cited

U.S. PATENT DOCUMENTS

| 5,737,736 | A | 4/1998 | Chang |
| 5,768,564 | A | 6/1998 | Andrews et al. |

(Continued)

OTHER PUBLICATIONS

Sevilla et al., Allowing applications to evolve with the Internet: The case for Internet Resource Descriptors, 6 pages (Year: 2014).*

(Continued)

*Primary Examiner* — Thuy Dao
(74) *Attorney, Agent, or Firm* — Hall Estill Law Firm

(57) ABSTRACT

Method and apparatus for automatically generating, verifying and using software bindings. A function collector extracts functions from a library written in a first computer language in the form of exposed application program interfaces (APIs), and writes identifying information for the functions to a knowledge base. A document collector concurrently extracts human readable text, such as in the form of embedded comments and user manual documentation, and links this text in the knowledge base to the extracted functions. A set of generators operate to generate software language bindings and a user interface to enable a user to activate and review the human readable text using a different, second computer language. A test script generator can automatically validate operation of the software language bindings using verified test data sets.

20 Claims, 6 Drawing Sheets

Related U.S. Application Data

(60) Provisional application No. 62/801,346, filed on Feb. 5, 2019.

(51) Int. Cl.
| | |
|---|---|
| *G06F 9/54* | (2006.01) |
| *G06F 9/44* | (2018.01) |
| *G06F 15/16* | (2006.01) |
| *G06F 8/30* | (2018.01) |
| *G06F 8/73* | (2018.01) |
| *G06F 11/36* | (2006.01) |
| *G06N 5/02* | (2006.01) |
| *G06F 9/451* | (2018.01) |

(52) U.S. Cl.
CPC ...... *G06F 11/3684* (2013.01); *G06F 11/3692* (2013.01); *G06N 5/02* (2013.01)

(58) Field of Classification Search
CPC . G06F 9/547; G06F 8/30; G06F 8/315; G06F 8/73; G06F 9/451; G06F 11/3684; G06F 11/3692; G06Q 10/10; H04L 67/02; H04L 67/1021; H04L 67/28; H04L 67/2814; H04L 67/0272
See application file for complete search history.

(56) References Cited

U.S. PATENT DOCUMENTS

| | | | |
|---|---|---|---|
| 5,842,204 A | 11/1998 | Andrews et al. | |
| 6,031,993 A | 2/2000 | Andrews et al. | |
| 6,546,549 B2 | 4/2003 | Li | |
| 6,698,014 B1 | 2/2004 | Rechter | |
| 7,131,110 B2 | 10/2006 | Brewin | |
| 7,346,897 B2 | 3/2008 | Vargas | |
| 7,774,782 B1 | 8/2010 | Popescu et al. | |
| 7,814,470 B2 | 10/2010 | Mamou et al. | |
| 8,332,828 B2 | 12/2012 | Vargas | |
| 8,656,372 B2 | 2/2014 | Vargas | |
| 8,762,963 B2 | 6/2014 | Shacham et al. | |
| 8,949,794 B2 | 2/2015 | Tempel et al. | |
| 8,984,497 B2 | 3/2015 | Takeuchi | |
| 9,069,567 B1* | 6/2015 | Sams | G06F 8/41 |
| 9,430,200 B1* | 8/2016 | Trofin | G06F 8/4435 |
| 9,459,862 B2 | 10/2016 | Araya et al. | |
| 9,531,753 B2 | 12/2016 | Morrison et al. | |
| 9,660,876 B2 | 5/2017 | Lipstone et al. | |
| 9,778,922 B2 | 10/2017 | Hill, III | |
| 10,061,573 B2 | 8/2018 | Araya et al. | |
| 10,152,308 B2 | 12/2018 | Prodan et al. | |
| 10,318,316 B2 | 6/2019 | Chefalas et al. | |
| 10,466,975 B2 | 11/2019 | Cimadamore et al. | |
| 10,585,683 B2 | 3/2020 | Wells et al. | |
| 2006/0080648 A1 | 4/2006 | Anwar et al. | |
| 2009/0327930 A1 | 12/2009 | Argue et al. | |
| 2011/0125798 A1 | 5/2011 | Misch et al. | |
| 2015/0242194 A1 | 8/2015 | Vargas | |
| 2019/0004790 A1 | 1/2019 | Choudhary et al. | |

OTHER PUBLICATIONS

Lamothe et al., Exploring the use of automated API migrating techniques in practice: an experience report on Android, 12 pages Year: 2018).

Kristensen et al., Type test scripts for TypeScript testing, 25 pages (Year: 2017).

* cited by examiner

AUTOMATED GENERATION OF SOFTWARE BINDINGS

RELATED APPLICATIONS

The present application is a continuation of co-pending U.S. patent application Ser. No. 16/782,786 filed on Feb. 5, 2020, which issues as U.S. Pat. No. 10,846,059 on Nov. 24, 2020, which makes a claim of domestic priority to U.S. Provisional Patent Application No. 62/801,346 filed Feb. 5, 2019, the contents of which are hereby incorporated by reference.

BACKGROUND

Software bindings bridge software code written in two different computer programming languages so that a set of source files (e.g., a "library") written in a first language can be accessed using a set of access files (e.g., "scripts") written in a second language. The software bindings operate as a mapping interface to enable functions native to the source files to be executed by user inputs supplied via the access files.

The source files may be written in a so-called "low level" programming language. Examples include, but are not limited to, languages such as C, C++, Pascal, Fortran, Ada, etc. Low level programming languages tend to be older, and often require the operation of a compiler to transform the code into a machine readable form prior to execution. For this reason, low level programming languages are also sometimes referred to as compiled languages.

The access files may be written in so-called "high level" programming languages, which tend to be more recently developed languages. Current examples of high level programming languages include Java, Python, Common Lisp, JavaScript, etc. High level programming languages may be described as "interpretive" languages since many machines can execute the code directly without a traditional compiler operation to place the code in a form that can be executed by the associated processor(s).

There are a number of reasons why it may be desirable to maintain a set of source files in an older programming language, rather than rewriting the code into a more modern programming language. The source files may represent legacy code that has reliably operated over an extended period of time under a wide variety of circumstances, and thus the trustworthiness of the code has been demonstrated (e.g., the code is "bullet-proof"). As long as the older legacy code is still operable, it might not make sense to rewrite the library into a new language. Not only would the update require the expenditure of significant resources, but the transformation could introduce errors or other unintended consequences that are not present in the old code. Even if the transformation from old code to new code is successful, the new code would still not have the same track record of reliability of the older legacy code.

Another benefit of code written in a lower level programming language is that the code can often be executed at a lower software level in a given system, leading to faster and more efficient operation. This can be particularly beneficial in computationally complex applications, such as in the areas of engineering, scientific research, space exploration, environmental monitoring, climate modeling, medical, geology, biotechnology, pharmaceutical research, etc. While it is true that substantially any desired task can be implemented in substantially any language, those skilled in the art will recognize that languages are usually tailored to particular applications. It follows that some computer languages are simply more suitable than others for a given set of tasks.

On the other hand, source files that have been written in low level programming languages can be difficult to use, update and expand, particularly by less experienced computer scientists who tend to be more familiar with newer, high level programming languages. Another disadvantage of older programming languages is that the outputs of legacy code systems can be difficult to integrate into larger systems with expanded capabilities. For example, an older computer language developed for use in mainframe environments may not necessarily work efficiently in modern Internet or distributed cloud computing environments.

Software bindings have been proposed and used in the art to take advantage of the user input and integration benefits of high level programming languages, while maintaining the computational efficiencies and reliability of low level programming languages.

At present, the generation and certification of software bindings is a difficult and time consuming process, since the generation of effective software bindings usually requires detailed knowledge by the programmer of both the legacy language in which the native code is written as well as knowledge of the modern language in which the interface is to be written. Software bindings of the current art can also tend to overlook or improperly utilize native capabilities of the source files, leading to a diminishment of the value of the source files.

There is accordingly a need for improvements in the manner in which software bindings are generated, verified, integrated and used, so that the full value and capabilities of the legacy code can be extracted and utilized by individuals that may or may not have a working knowledge of the programming language in which the legacy code is written. It is to these and other improvements that various embodiments of the present application are directed.

SUMMARY

Various embodiments of the present disclosure are generally directed to an apparatus and method for generating, verifying, integrating and using software bindings to enable source files written in a first programming language to be executed using access files written in a second programming language.

As explained below, some embodiments provide an apparatus having a function collector arranged as executable programming code by a programmable processor configured to parse each of a plurality of source files of a native library written in a first computer language to extract functions in the form of exposed application program interfaces (APIs). The function generator writes identifying information associated with each of the extracted functions to a knowledge base stored as a data structure in a memory.

A documentation collector locates sections of non-executable human readable text in the plurality of source files associated with the extracted functions and to reproduce the human readable text in the knowledge base in a manner that is linked to the identifying information for each of the extracted functions.

A software binding generator accesses the knowledge base to generate a set of software language bindings in a different, second computer language, each software language binding comprising an executable script that, when executed, activates a corresponding extracted function from the source file.

Finally, a documentation generator arranges the associated human readable text from the knowledge base in a user accessible form for reference during execution of the software language bindings.

These and other features and advantages of various embodiments of the present disclosure can be understood from a review of the following detailed description in conjunction with the accompanying drawings.

DETAILED DESCRIPTION

Without limitation, at least some aspects of the present disclosure are generally directed to the generation, verification, integration and use of software bindings to take advantage of, and expand the capabilities of, existing legacy code libraries written in older computer programming languages.

As explained below, some embodiments are arranged in the form of a computer system with at least one programmable processor with associated programming stored in a local processor memory. The system operates to generate a software binding in the form of a set of access files that enable a user to execute native functions in a set of source files. The source files may be written in a first, low level language, and the access files may be written in a second, high level language. The system generates these files in an automated fashion, and ensures that all available functions, as well as all available user documentation, is extracted and made available for use by the user. The system further has the capability of fully testing and verifying the capabilities of the software binding prior to use.

Figure 1:
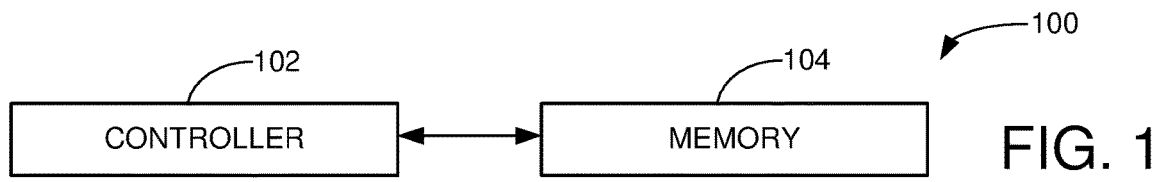
FIG. 1 is a functional block diagram of a data processing system configured and operated accordance with some embodiments.

These and other advantages and features of various embodiments can be understood beginning with a review of FIG. 1 which provides a generalized functional block diagram of a data processing system 100. The data processing system 100 includes a controller 102 and a memory 104. The controller 102 includes at least one programmable processor (central processing unit, CPU) that can be realized in substantially any computer processing environment including but not limited to a server, a cloud computing network, a workstation, a super computer, a distributed network of processors, a local PC, a laptop or other portable device, or any combination thereof.

The memory 104 includes local memory accessible by the controller 102, as well as one or more mass storage systems having non-volatile memory (NVM) to store the various files, programs, data sets, parameters, etc. used by the system. The memory 104 can include a local mass storage device (e.g., an SSD, an HDD, etc.), a group of such devices in a distributed storage network, a cloud computing environment, etc. Regardless of the processing environment, it will be appreciated that the following description will represent suitable programming executed by one or more programmable processors (CPUs), represented by the controller 102, upon data that is stored in a suitable memory location, represented by the memory 104.

Figure 2:
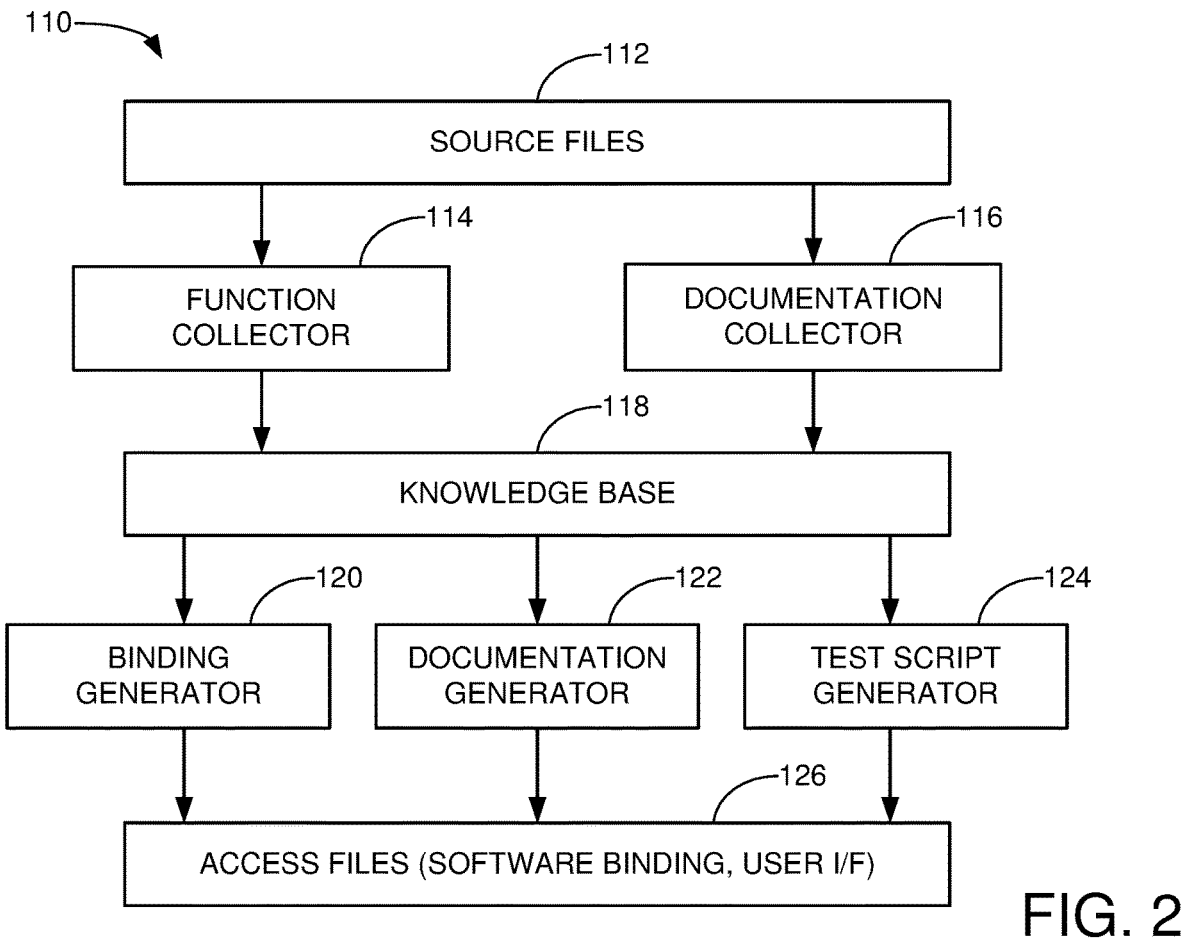
FIG. 2 is a functional block diagram of an automated system that can be operated by the data processing system of FIG. 1 to generate, verify and use software bindings in accordance with some embodiments.

FIG. 2 provides a functional block diagram of an automated software binding system 110 that can be operated by the data processing system 100 of FIG. 1 to generate, verify, integrate and use software bindings in accordance with some embodiments. The system 110 represents data sets and programming stored in the memory 104 and utilized by the controller 102. Additional programming, parameters and inputs, such as a configuration file (not separately shown), can be utilized as required to execute the various functions and produce the various outputs that will now be described.

The system 110 operates upon a set of source files 112, which represent a first set of data for which software bindings will be generated by the system. The source files 112 are written in a first computer language and may be arranged as a library made up of one or more computer files. To provide a concrete example, it is contemplated without limitation that the source files 112 are realized using a first, low level computer programming language, such as C++, although other languages can be used.

One example for the source files includes the so-called SPICE Toolkit by the Jet Propulsion Laboratories (JPL), Pasadena, Calif., USA, which is a proven tool useful in plotting orbital trajectories for spacefaring craft. Other examples include geological libraries from public or private sources that enable evaluation of seismic data. Still other examples can include chemical libraries that model molecular interactions. Other applications can be used.

It is not necessarily required that the source files be directed to a particularly mathematically complex system, nor that the source files be a low level compilable language. Rather, as explained below the system 110 can operate to provide the required transformation from a library written in substantially any first programming language to enable enactment in access files written in substantially any different, second programming language. The source files 112 in FIG. 2 thus represent a library of files in a first language, of whatever form or type, that have some sort of useful function and capability.

The system 110 includes a number of data collectors, as represented by a function collector 114 and a documentation collector 116. Other forms of data collectors can be used. The functional arrangement and operation of these collectors will be discussed in detail below, but at this point it will be understood that the collectors operate to automatically extract useful information from the source files 112 to generate a data structure. The data structure is represented by a knowledge base 118. The function collectors 114 identify exposed application program interfaces (APIs) that are accessible within the source files, and the documentation collectors 116 locate and extract human readable text that explains the operation and flow of the source files, to enable intelligent use thereof.

The knowledge base 118 is stored in a suitable memory, such as the memory 104 in FIG. 1. The basic idea of the collectors is that they have sufficient capability to extract substantially all of the useful information from the source files 112. It is possible that the collectors may extract additional information that is not of any particular use during the transformation process. Still, the idea is that the collectors are scavengers that extract all useful information from the source files, even if not all of the extracted information is used.

Once the knowledge base 118 is generated, a number of generator modules operate thereupon. The generators shown in FIG. 2 include a binding generator 120, a documentation generator 122 and a test generator 124. Other forms of generators can be used. Regardless of form, the generators operate to automatically generate and certify a set of access files 126. The access files 126 are written in a second computer language and enable a user to activate and use the source files 112.

For purposes of the present discussion it will be contemplated that the access files 126 are written in JavaScript. Other secondary languages can be used. The binding generator 120 generates the binding layer that carries out the transformation between the languages as well as, as required, a suitable user interface to enable the binding layer to be utilized. The documentation generator 122 extracts and organizes the user text in the source files 112. The test script generator 124 verifies the operability of the access files 126, and provides assurance to the user that the full capabilities of the source files have been presented via the access files. The system can be arranged to accommodate substantially any number of different programming languages and hardware environments for both the original source files as well as for the access files.

Figure 3:
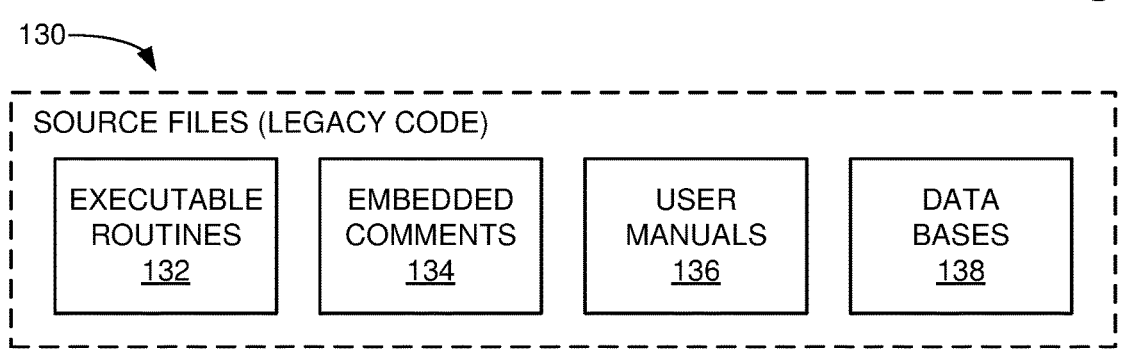
FIG. 3 provides a generalized format for the contents of the source files (legacy code) from FIG. 2 in some embodiments.

FIG. 3 shows a functional representation of a set of source files (legacy code) 130. The source files 130 correspond to the source files 112 in FIG. 2. This is intended to represent, at a general level, the types of data sets that can be evaluated by the system 110. It does not matter what format in which the source files are arranged. In some cases, the system 110 has the capability of evaluating the source code and automatically identifying the language(s) in which the source files are written. In other cases, the native language(s) will be known, so the system can be preconfigured to select the appropriate tools to extract the required information. Different function and documentation collectors can be arranged to accommodate a wide variety of native languages.

An existing source file library will have certain features including a number of executable routines 132, which are functions that carry out a particular result based on some number of inputs (arguments). A typical function will have at least one input and at least one output, but this is not necessarily required; for example, a function may operate to generate an output (e.g., a random number generator) without utilizing a user input. Similarly, a function may receive one or more values that are simply stored without the generation of a corresponding output, such as a data collection module. In still other cases, functions may be embedded so that a first function supplies the input to a second function, which in turn may call other embedded routines or databases to arrive at a final result.

Another feature of typical legacy code is that most code arrangements will have embedded comments, which represent user text that is not expressly executed by the processor, but enables a human observer to understand the flow of the code. Block 134 represents those aspects of comments that have been embedded in the code to give a human observer certain useful information, such as the purpose of a given function, the names and characteristics of a given argument (variable), and the reason why the function is performed. While not limiting, embedded comments may be embedded within a selected line of code, set off by a suitable syntax identifier (e.g., a colon, a semicolon, etc.). The comments enable a programmer to understand the purpose of the executable code in a line in or adjacent the identifier.

Block 136 represents additional user documentation in the source files. This documentation may be in the form of user manuals or other reference material. These documents may be arranged in a text form (e.g., pdf, etc.) and may not necessarily include executable functions. Block 138 represents one or more data bases or other structures that may be referenced and used during operation of the source files. It will be appreciated that the source files can include other forms and types of data, so FIG. 3 is merely exemplary and is not limiting.

Figure 4:
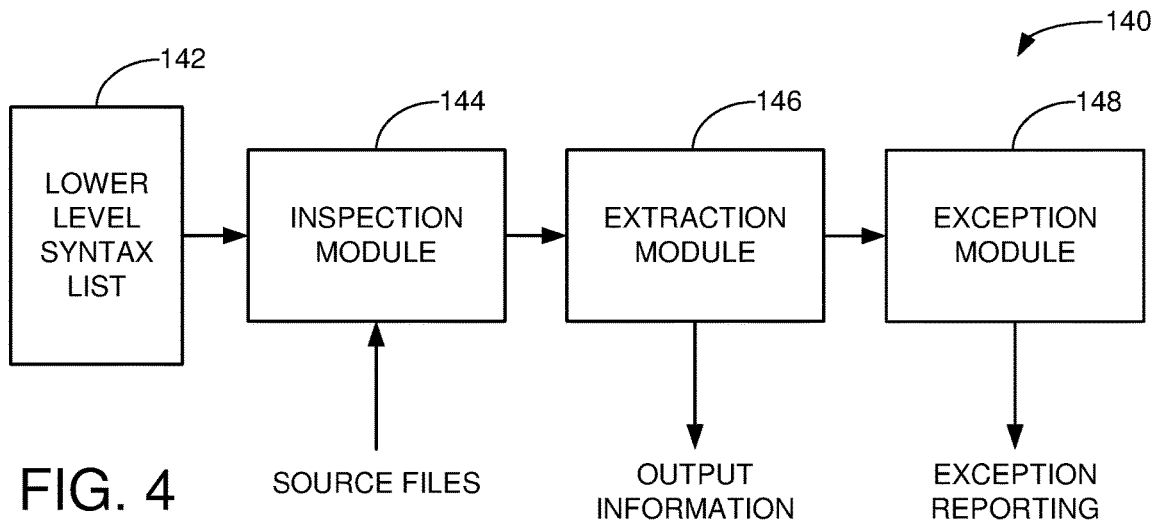
FIG. 4 is a functional block diagram of a collector module from FIG. 2 to collect, evaluate and organize the contents of the source files from FIG. 3.

FIG. 4 is a generalized block representation of a collector 140 of the system 110 in FIG. 2. The collector 140 can correspond to the function collector 114, the documentation collector 116, or other forms of collectors used by the system. The collector 140 includes a lower level syntax list 142, which may be a data base or other form of data associated with the computer language of the source files. A different list 142 may be provided for each of a number of different computer languages that can be evaluated (e.g., C, C++, Pascal, etc.) by the system.

An inspection module 144 uses the syntax list 142 in order to identify, during a scan, the elements being parsed from the source files. When operated as a function collector, the syntax list 142 identifies those characters that tend to identify functions (e.g., exposed application program interfaces, APIs) within the source files. When operated as a documentation collector, the syntax list 142 identifies those characters that tend to set apart embedded comments and other forms of user documentation. In some cases, the inspection module 144 will identify candidates for the types of data being parsed from the source files.

An extraction module 146 uses the output from the inspection module 144 to evaluate, confirm and output information associated with the associated functions and documentation. The types, locations, parameters, links, etc. are accumulated and appended to the knowledge database 118 (FIG. 2) to enable the associated elements to be located and used.

Finally, an exception module 148 can be used to evaluate the completeness of the output information from the extraction module 146. This can include a rules database (which can be incorporated as part of the syntax list 142) that verifies whether the extracted information is complete and appears operable or otherwise useful. The exception module 148 outputs an exception report that identifies any deficiencies (exceptions) that were noted during the parsing of the source files. Other statistics can be gathered and reported as well, such as an overall listing of which files were examined, how many elements were extracted, various information such as tree structures or other interrelationships that were detected, and so on.

Figure 5A:
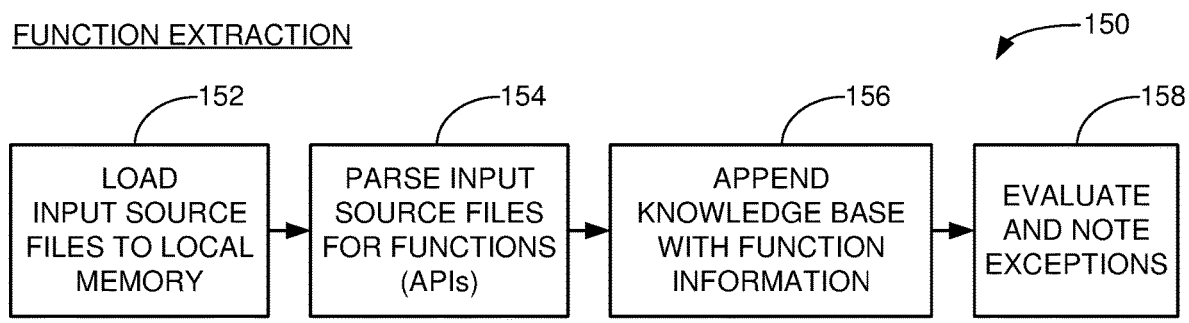
FIGS. 5A and 5B are sequence diagrams to illustrate operation of respective collector modules as arranged in FIG. 3 to respectively extract and merge functions and comments from the source files in FIG. 3.
Figure 5B:
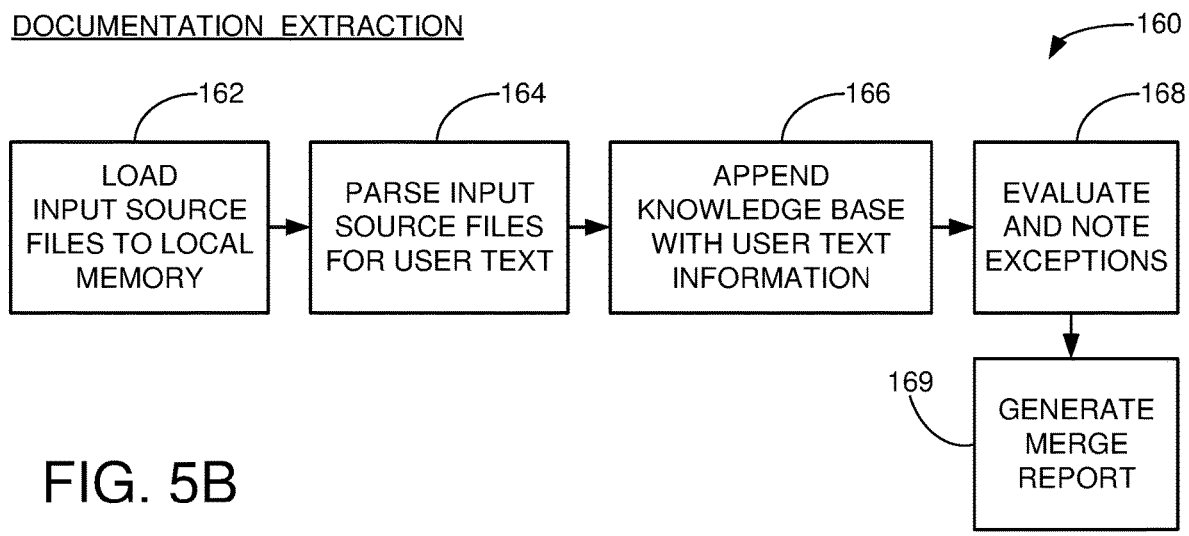

FIGS. 5A and 5B provide respective sequence diagrams 150, 160 to illustrate operation of the collector 140 as a function collector and as a documentation collector. The function extraction diagram 150 in FIG. 5A commences at block 152 with loading of the input source files to a local memory, such as the memory 104 in FIG. 1. The files are parsed at block 154 as described above to locate functions (exposed APIs). The confirmed functions are appended to the knowledge database 118 at block 156, and exception reporting is generated and output at block 158.

The documentation extraction routine 160 in FIG. 5B can be carried out concurrently with the function extraction of FIG. 5A. Upon the loading of the source files at block 162, user text elements are identified at block 164, evaluated and appended at block 166, and exceptions are reported at block 168. Block 169 shows an integration operation that can be carried out to merge or otherwise link user text elements with the functions identified in FIG. 5A. In this way, all of the sections of useful user text that could be located are associated with the corresponding functions. Other summary statistics can be incorporated into the merge reporting as desired.

Figure 6:
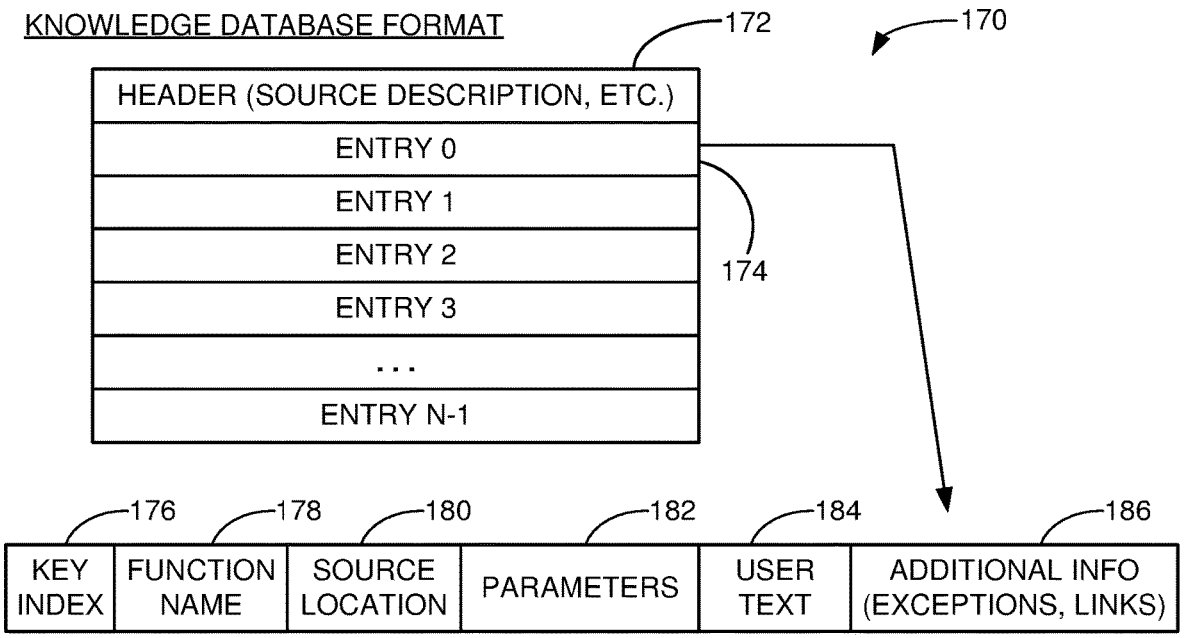
FIG. 6 is a generalized format for the knowledge database in FIG. 2.

FIG. 6 is a simplified format 170 for the knowledge database 118 of FIG. 2. It will be appreciated that the extracted information can take any number of suitable forms, so the format represented in FIG. 6 is merely exemplary and is not limiting. The database can be arranged as a look-up table, a linked list, a grouping of files in one or more directories or subdirectories, etc. Regardless, the overall arrangement may be conceptualized as a header portion 172 and a number of N entries 174.

The header 172 provides top level information, including descriptors for the original source files, version information, addresses, date codes, and other data extracted from or otherwise related to the source files and the access files.

Each entry 174 is associated with a separate function and may include various identifier values such as a unique key index 176, a function name 178, a source location 180 for the function, various parameters (including inputs and outputs) 182 used by and/or generated by the function, user text 184 such as embedded comments or external documentation from a manual or other source that describes the function, and additional information 186 associated with the function. Other forms of data can be arranged as required.

Figure 7:
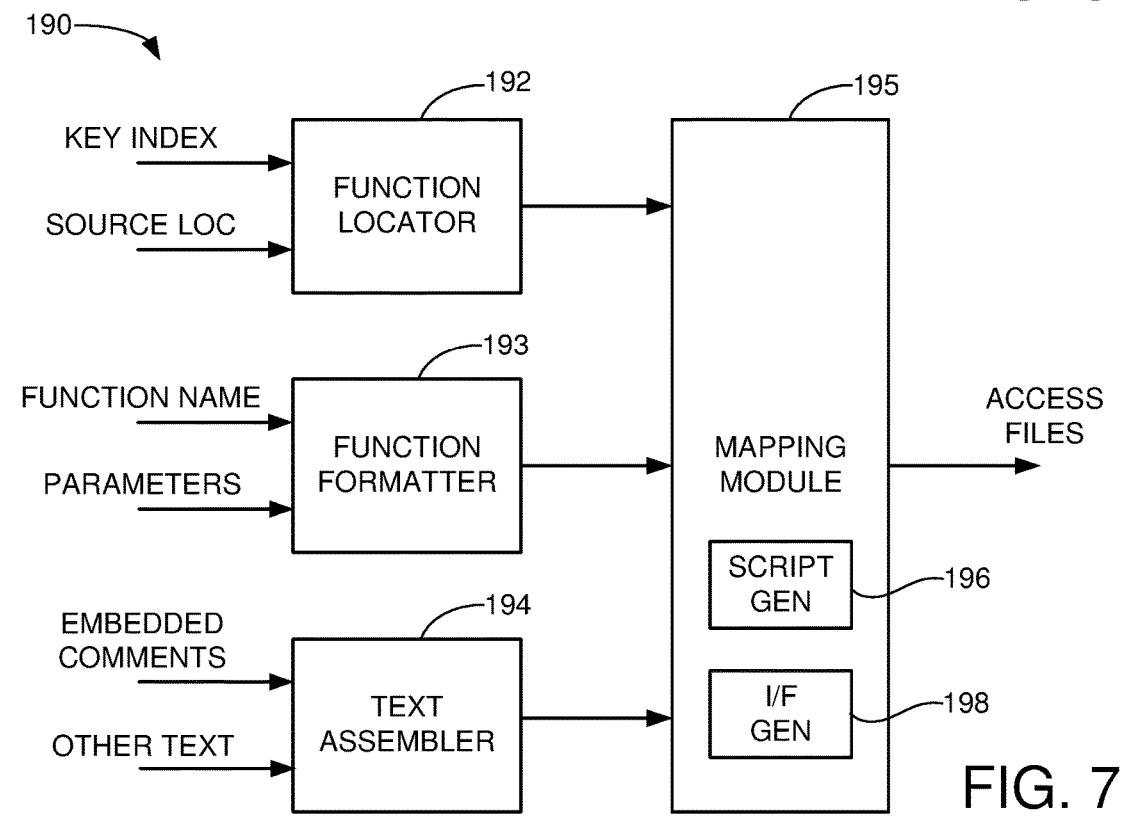
FIG. 7 is a functional block diagram for a generator module that corresponds to the function and documentation generators of FIG. 2 in some embodiments.

The types and arrangement of the data in each entry 174 are such that a generator module 190, as depicted in FIG. 7, can automatically generate the access files 126 (FIG. 2) to utilize the source files 112. The generator module 190 generally corresponds to the binding and documentation generators 120, 122. The test script generator 124 will be discussed separately below.

The generator module 190 in FIG. 7 is shown to include a function locator 192, a function formatter 193 and a text assembler 194. These respective modules operate to extract and incorporate the extracted data from each entry 174 in the knowledge database in turn. As before, the arrangement of FIG. 7 is merely for purposes of illustration and is not limiting.

The function locator 192 uses the key index and source location information to identify and characterize each function. The function formatter 193 evaluates the parameters that are used by the function and arranges the necessary information to enable the function to be called and executed by the access files. The text assembler 194 evaluates and links the comments in a suitable format for use.

A mapping module 195 uses the outputs from the respective modules 192, 193 and 194 to generate the software bindings in the high level language (e.g., JavaScript in the present example), as well as other required elements. A script generator 196 generates the executable JavaScript elements, and an interface (I/F) generator 198 formats a suitable user interface. While not limiting, in some cases a webpage format (e.g., HTML, XML, etc.) can be automatically generated to enable the user to access the various functions and user text.

Figure 8:
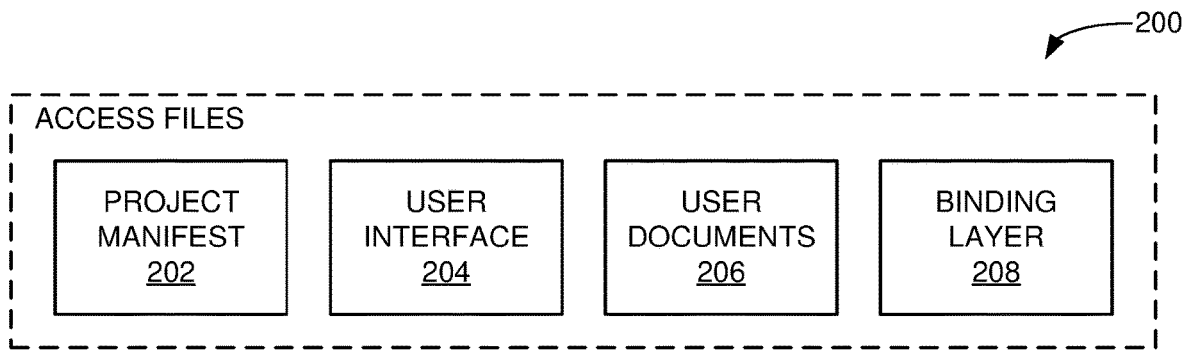
FIG. 8 is a generalized functional format for the access files generated by the system of FIG. 2 in some embodiments.

FIG. 8 shows an exemplary format 200 for the access files 126 output by the mapping module 195 of FIG. 7. Other formats can be used. In some cases, a product manifest 202 will provide top level information regarding the names and locations of the source files, the date and time of the software binding generation, and other useful data for the user.

A user interface 204 can be generated that provides a display that can be activated, such as from a computer monitor screen, to enable the user to access and use the software bindings. Hyperlinks and other elements can be used to provide easy access to a library of functions from the source files. The user text can be easily accessed to provide the user with detailed information regarding each function. If user manuals form a portion of the source files, these may be reproduced in a searchable format, as represented at 206.

A binding layer 208 represents the actual software language binding files, scripts or other elements necessary to perform the translation and pass data in the appropriate formats to and from the source files.

Figure 9:
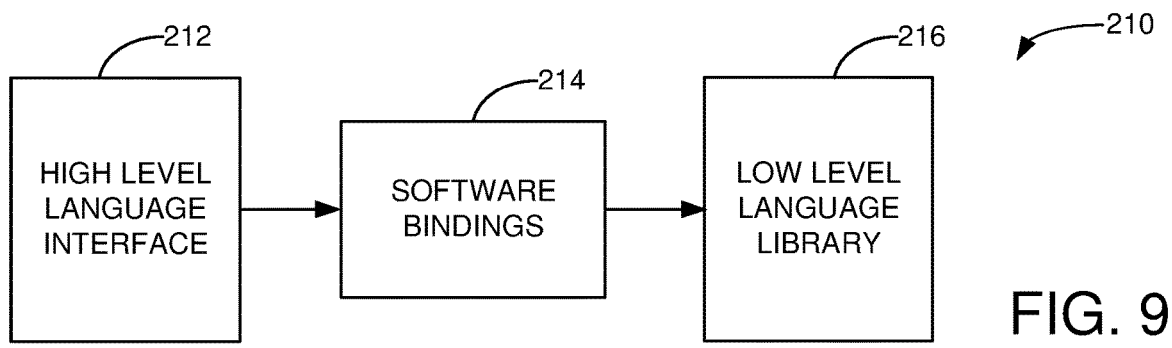
FIG. 9 shows operation of the access files in some embodiments.

FIG. 9 is a functional block representation of an operational system 210 generated using the modules discussed above. The system 210 includes a high level language interface 212, which incorporates the user interface 204 and user documents 206 from FIG. 8. The user activates the system using appropriate inputs to the interface 212. A set of software bindings 214 correspond to the binding layer 208 and operate to translate the user inputs for use by a low language library 216, which correspond to the source files for which the bindings are generated.

Figure 10:
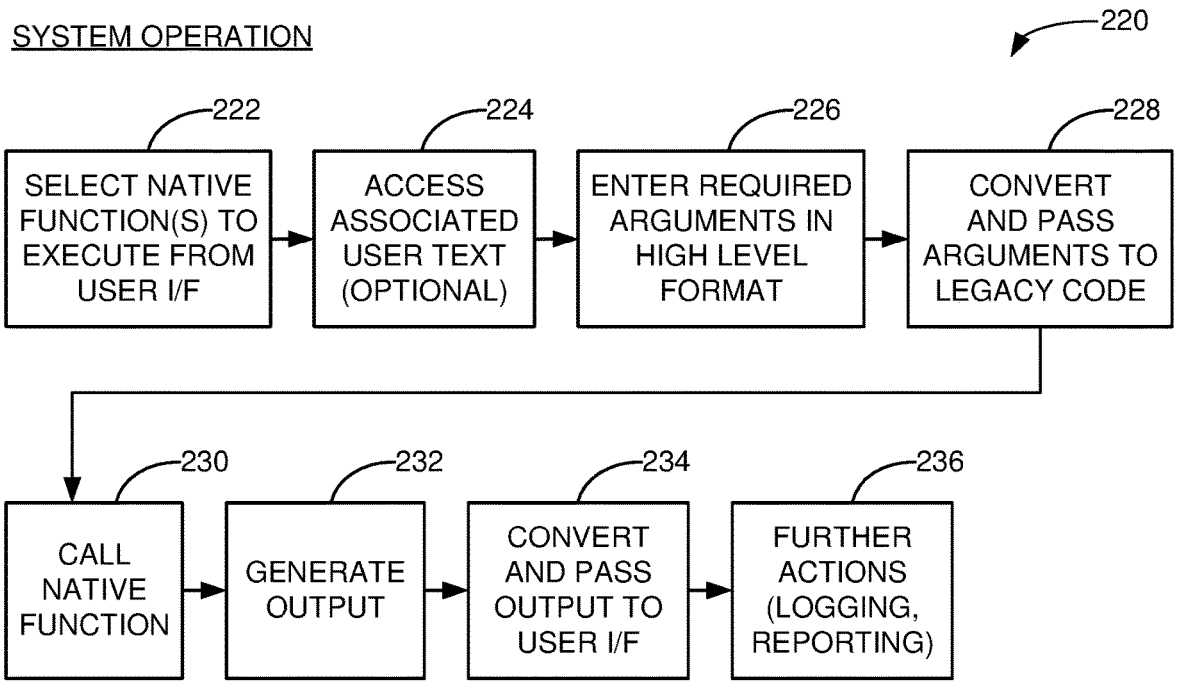
FIG. 10 is a sequence diagram for the system of FIG. 9.

FIG. 10 is a sequence diagram 220 illustrating operation of the system 210. One or more native functions are initially selected by the user at block 222. As desired, the user may peruse the associated user text at block 224. The required inputs (e.g., arguments) are entered at block 226. These arguments may be formatted in accordance with the high level language (e.g., JavaScript).

The software bindings are activated to convert and pass the arguments to the legacy code, block 228. The native function is called at block 230, which generates a suitable output, block 232. The output is returned and converted back to the high level language format at block 234. Further optional steps may be taken at block 236, such as data logging, reporting, etc.

To give a simplified example, let it be assumed that one of the native functions of the source files provides a function referred to as integer addition, where two integers are added together to generate a result. The flow of FIG. 10 would thus include steps of user entry of the integers in a format specified by the user documentation, and presentation such as via the specially configured user interface. Fields may be made available in the user interface for this operation. The format of the input integers may be in a first form suitable for use in the high level language (e.g., JavaScript).

The integers are converted to a format suitable for the low level language (e.g., C++), and forwarded along with an execution call to the source files. Part of this may include a check to ensure all required parameters are present (e.g., two and only two inputs have been supplied, the inputs are integers in an acceptable format, etc.). The desired function is located, loaded, and executed to generate an output (e.g., the two inputs are summed together to output a result). The output is thereafter checked, converted back to a format suitable for the high level language, and returned to the caller mechanism, such as via display on the user interface.

Figure 11:
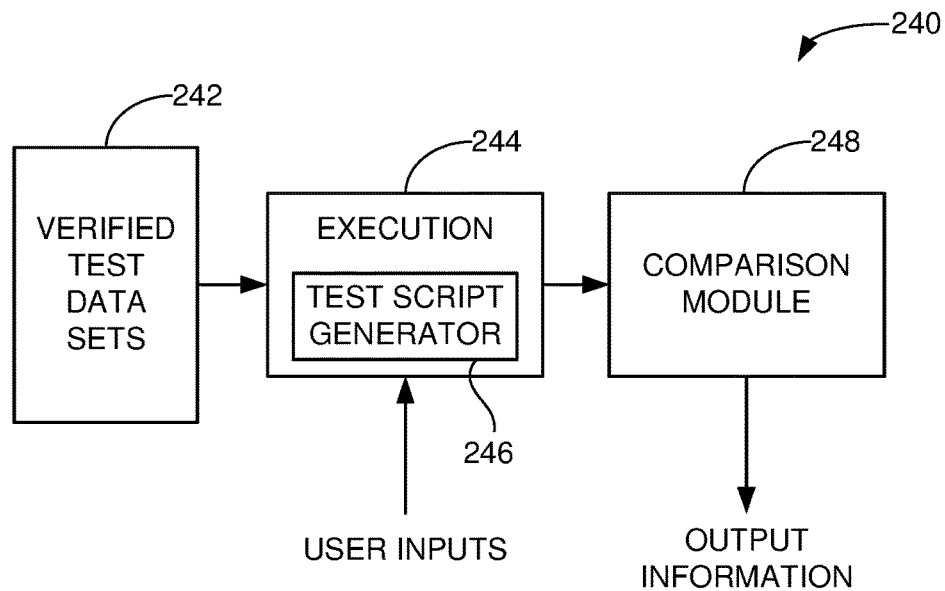
FIG. 11 is a functional block representation of the test generator of FIG. 2 in some embodiments.

FIG. 11 shows a functional block representation of a test generator 240. The generator 240 generally corresponds to the generator 124 in FIG. 2, and operates to automate the verification functions necessary to assure the software bindings and other access files operate correctly. As will be appreciated, a well attested set of source files will not generally operate as required if there are deficiencies, errors or other limitations in the software bindings and user documentation.

The test generator 240 includes a number of elements including a verified set of test data 242. While not necessarily required, one way in which the access files can be verified is by using a set of known inputs and outputs by the native code in the source files. These data sets can be gathered from separate operation of the source files using the source file interface, can be separately established as a master set of calibration data points. It is contemplated that the test data will be of the type that utilizes all of the native functionality of the source files, in various combinations, to provide a valid stress test of the system. By confirming that the access files generate the same outputs based on the verified known inputs, the functionality of the access files can be reliably demonstrated.

An execution module 244 sequentially examines and uses the test data sets to generate outputs using the flow of FIGS. 9 and 10. The test data can be manually entered by the user, or a test script generator 246 can be used to automate the process and reduce user data entry errors. A comparison module 248 compares the outputs generated by the test data with the certified outputs from the database 242 and ensures the respective outputs match.

Figure 12:
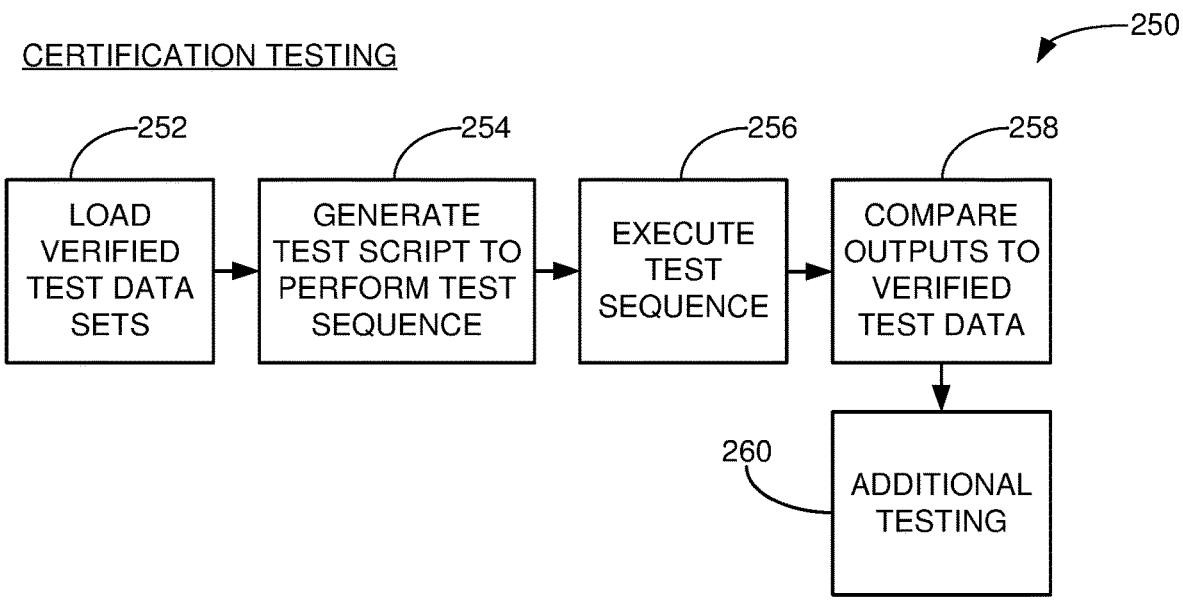
FIG. 12 is a sequence diagram for certification testing carried out by the module of FIG. 11.

FIG. 12 is a sequence diagram 250 to illustrate operation of the test generator 240. The verified test data sets are loaded at block 252. An optional test script is generated at block 254, and the required test sequence is executed at block 256. The outputs are compared and evaluated at block 258, with any error or problems noted and corrected as required. Additional testing can be further carried out at block 260. Certification test data can be collected and maintained to demonstrate compliance.

Figure 13:
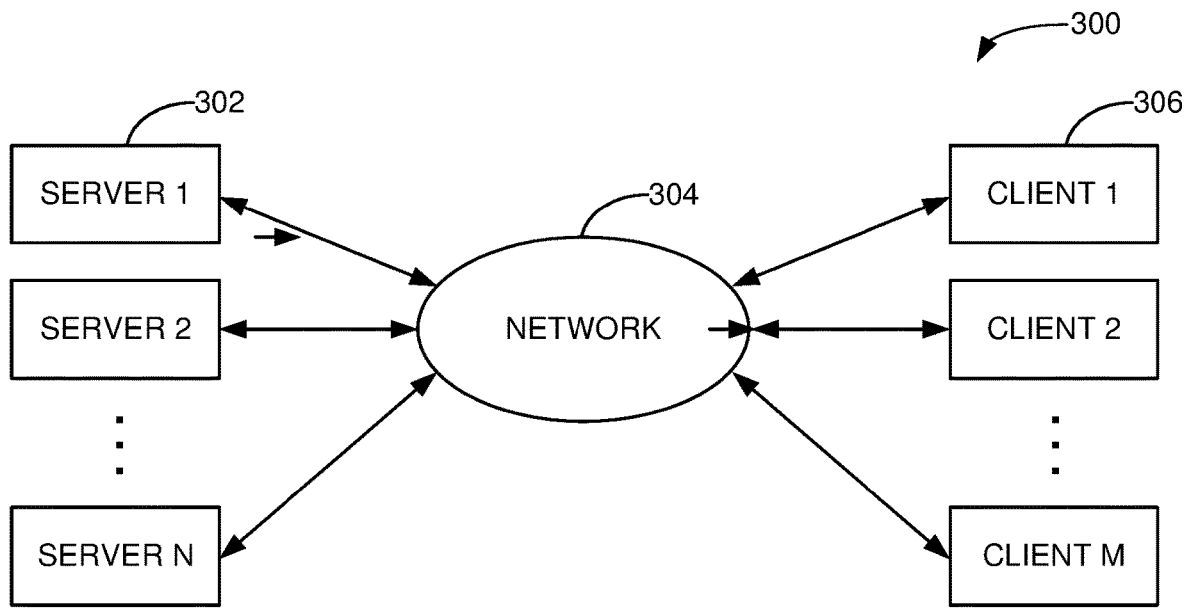
FIG. 13 is a functional block diagram of a networked data system.

FIG. 13 shows a distributed networked computer system 300 to illustrate another environment in which various embodiments can be realized. The system 300 includes a number of geographically distributed servers 302 coupled via one or more computer networks 304 (e.g., local networks, wide area networks, the Internet, etc.). Various client devices 306 are also coupled to the network. Various aspects of the system can be executed at any suitable level; for example, a selected client device can be used to generate and use the software bindings and other access files locally, while the source files are located remotely such as by one or more of the servers.

Figure 14:
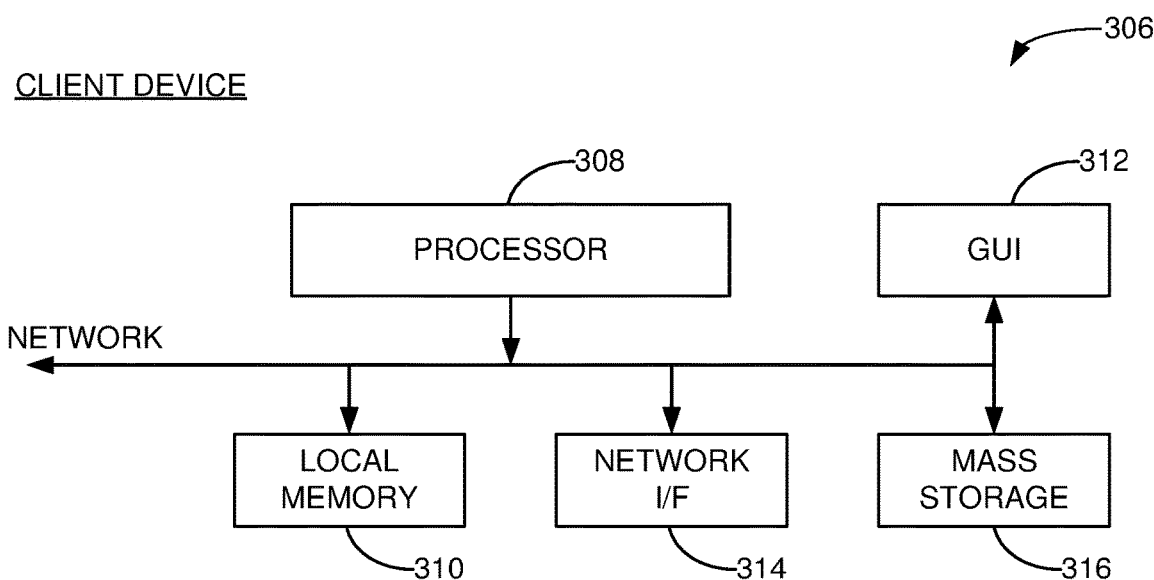
FIG. 14 shows a client device from FIG. 13 in some embodiments.

FIG. 14 shows each client device 306 in the form of a local computer or workstation. Other forms can be used. The client device includes various elements including a processor (central processing unit, CPU) 308 that provides top level control of the client device 306, as well as operability as described herein to generate, evaluate and use access files to selectively enact functionality of the source files. A local memory 310 stores the programming used by the CPU 308 during execution, as well as provides local storage of data during such operation. While not necessarily required, the local memory can store the source files (or a portion thereof), as well as the access files to enable access thereof. A graphical user interface (GUI) 312 enables user input and interaction with the system, and includes necessary user elements including a keyboard, mouse, touch screen, display, etc.

A network interface (I/F) 314 enables network communications as necessary to communicate and transfer commands and data sets with other elements of the network, such as other client devices 306 and with the servers 302. A mass storage module 316 provides local non-volatile memory (NVM) data storage, such as local flash memory, rotatable disc storage, etc.

The system can be configured to operate on a web service basis. One embodiment arranges the access files as JavaScript files or other executable files that are executed using a local web browser. The collectors and generators can be arranged as web services that make calls to remote resources to perform the various operations described herein. Another embodiment utilizes a command line interface (CLI) arrangement to execute the various scripts and perform the various functions. It is contemplated but not required that a suitable user interface will be generated as part of the operation of the system. It is further contemplated although not required that the system will enable integration with other, larger systems, so that the source files can be made a part of a larger useful system.

For purposes here, a function describes one or more lines of computer programming language that executes an operation to generate a result. Arguments (variables) are named elements upon which the functions operate. User text refers to any and all forms of human readable text that provides useful information to describe the flow and arrangement of the source files, and includes but is not limited to embedded comments, user manuals, and other descriptive documentation. Collectors are defined as modules that locate and extract information in the form of exposed functions (APIs) and human readable text. Generators are defined as modules that take the extracted information and provide a useful result using the extracted information, including the generation of executable computer code, the display of useful human readable text, and the validation of interface operations.

It will now be appreciated that the various embodiments discussed above provide a number of benefits over the existing art. The system can evaluate and extract all useful information regarding an existing library of source files written in substantially any computer language to identify functions and associated documentation, and associate these elements in a knowledge database. The system can further automatically parse the extracted information from the knowledge database and generate suitable software language bindings and user interface elements to enable a user to activate and use the various functions of the original source files. The system can further be configured to automatically evaluate and validate the effectiveness and reliability of the access files. Exception reports can be generated to enable a computer programmer to examine and resolve any noncompliance issues. The source files can be integrated into larger systems, enabling seamless operation and expanded capability and extended usefulness of legacy code.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. An apparatus comprising:
a programmable processor; and
a memory storing program instructions which, when executed, cause the programmable processor to implement the following:
a function collector configured to parse a native library of files to extract functions in the form of exposed application program interfaces (APIs) written in a first computer language, and to assign each extracted function a unique identifier value;
a documentation collector configured to parse the native library of files to extract sections of non-executable human readable text that explain operation or flow of the extracted functions, and to associate the sections of extracted text with the extracted functions using the unique identifier values; and
a software binding generator configured to generate a set of software language bindings in a different, second computer language, each software language binding comprising an executable script that, when executed, activates a corresponding extracted function from the source file using the identifier value associated with the corresponding extracted function.

2. The apparatus of claim 1, wherein the function collector identifies the exposed functions by detecting characters within source files of the native library, the characters of the type associated with functions, the source files written in the first computer language.

3. The apparatus of claim 1, wherein the documentation collector identifies the sections of extracted text by detecting characters within source files of the native library, the characters of the type configured to set apart embedded comments, the source files written in the first computer language.

4. The apparatus of claim 3, wherein the documentation collector further identifies sections of non-executable human readable text from a user manual of the native library.

5. The apparatus of claim 1, wherein the executed program instructions further cause the programmable processor to implement a knowledge base as a data structure in the memory that lists, by the associated identifier value, each of the extracted functions and the associated section of extracted text.

6. The apparatus of claim 5, wherein each of the extracted functions in the knowledge base is associated with a unique function name and a source location in the native library at which the associated extracted function is located.

7. The apparatus of claim 1, wherein the executed program instructions further cause the programmable processor to display the sections of extracted text on a user display so that a user can, through use of the identifier value, access and review the associated section of extracted text for the corresponding extracted function.

8. The apparatus of claim 1, wherein the executed program instructions further cause the programmable processor to implement a function locator configured to identify and characterize each function using the assigned index value and a source location value, a function formatter which evaluates parameters used by each associated function and arranges necessary information to enable the associated function to be called and executed, and a text assembler which combines embedded comments adjacent the extracted functions in the native library and other text separate from the extracted functions.

9. The apparatus of claim 1, wherein the executed program instructions further cause the programmable processor to implement an interface (I/F) generator which displays the sections of extracted text on a display of a user interface.

10. The apparatus of claim 9, wherein the user interface comprises an HTML webpage.

11. A method comprising:
parsing a native library of files to extract functions in the form of exposed application program interfaces (APIs) written in a first computer language;
assigning each extracted function a unique identifier value;
parsing the native library of files to extract sections of non-executable human readable text that explain operation or flow of the extracted functions;
associating each of the sections of extracted text with unique identifier value of the corresponding extracted function; and
generating a set of software language bindings in a different, second computer language, each software language binding comprising an executable script that, when executed, activates a corresponding extracted function from the source file using the identifier value associated with the corresponding extracted function.

12. The method of claim 11, further comprising executing at least a portion of the set of software language bindings to execute the corresponding extracted functions in the first computer language, and displaying results therefrom on a display.

13. The method of claim 11, wherein the extracted functions and the sections of extracted text are written to a knowledge base as a data structure in a memory arranged by the associated identifier value.

14. The method of claim 13, wherein the knowledge base comprises a plurality of entries each comprising the identifier value, a function name, a source location in the source files at which the function can be activated, parameters associated with the associated function, user text associated with the associated function, and additional information useful in accessing the associated function.

15. The method of claim 11, wherein the extracted functions are identified by detecting characters within source files of the native library, the characters of the type associated with functions, the source files written in the first computer language.

16. The method of claim 11, wherein the sections of extracted text are identified by detecting characters within source files of the native library, the characters of the type configured to set apart embedded comments, the source files written in the first computer language.

17. The method of claim 11, wherein the extracted functions are identified using a function language syntax listing stored in a memory which identifies syntax elements that identify a beginning and an ending of each exposed function in the source files, and using the function language syntax listing to identify each of the functions in the source files.

18. The method of claim 11, wherein the human readable text comprises embedded comments associated with the respective functions.

19. The method of claim 11, further comprising generating and executing a test script to validate the set of software language bindings using a set of verified test data sets that list verified outputs from the functions of the source files based on known inputs.

20. The method of claim 11, further comprising displaying the sections of extracted text on a display of a user interface.

\* \* \* \* \*